US012777250B2

(12) United States Patent
Kim et al.

(10) Patent No.: US 12,777,250 B2
(45) Date of Patent: Oct. 27, 2026

(54) IMAGE CAPTURING APPARATUS AND METHOD INCLUDING REFERENCE POSITION ERROR DETERMINATION

(71) Applicant: HANWHA VISION CO., LTD., Seongnam-si (KR)

(72) Inventors: Dae Bong Kim, Seongnam-si (KR); Dong Jin Park, Seongnam-si (KR); Joo Hye Noh, Seongnam-si (KR); Young Sang Kwon, Seongnam-si (KR); Jae Hyun Kim, Seongnam-si (KR)

(73) Assignee: HANWHA VISION CO., LTD., Seongnam-si (KR)

( * ) Notice: Subject to any disclaimer, the term of this patent is extended or adjusted under 35 U.S.C. 154(b) by 0 days.

(21) Appl. No.: 18/963,044

(22) Filed: Nov. 27, 2024

(65) Prior Publication Data

US 2025/0184606 A1 Jun. 5, 2025

(30) Foreign Application Priority Data

Dec. 1, 2023 (KR) ........................ 10-2023-0172040

(51) Int. Cl.

| | |
|---|---|
| ***H04N 23/67*** | (2023.01) |
| ***G06T 7/00*** | (2017.01) |
| ***G06T 7/80*** | (2017.01) |

(52) U.S. Cl.

CPC ......... *H04N 23/675* (2023.01); *G06T 7/0002* (2013.01); *G06T 7/80* (2017.01);
(Continued)

(58) Field of Classification Search

CPC .. H04N 23/675; H04N 23/671; H04N 23/673; H04N 23/55; G06T 7/0002;
(Continued)

(56) References Cited

U.S. PATENT DOCUMENTS

| | | | |
|---|---|---|---|
| 6,826,362 | B2 | 11/2004 | Matsuo |
| 2007/0229797 | A1 | 10/2007 | Sugimoto |

(Continued)

FOREIGN PATENT DOCUMENTS

| | | | |
|---|---|---|---|
| EP | 3 936 917 | A1 | 1/2022 |
| JP | 2007-133301 | A | 5/2007 |

(Continued)

OTHER PUBLICATIONS

Extended European Search Report dated Mar. 19, 2025, issued by the European Patent Office in European Application No. 24216377.2.

*Primary Examiner* — Mekonnen D Dagnew
(74) *Attorney, Agent, or Firm* — Sughrue Mion, PLLC

(57) ABSTRACT

An image capturing apparatus may include: an imager including a focus lens, the imager configured to generate an image of a subject; a distance determiner configured to determine a distance to the subject; a reference position calculator configured to calculate a reference position of the focus lens based on the distance to the subject; and a controller configured to adjust a focal position of the focus lens in a direction of the reference position, wherein the controller is further configured to determine whether any error is reflected in the reference position based on a calculated sharpness of the image corresponding to the focal position of the focus lens being at the reference position.

20 Claims, 16 Drawing Sheets

(52) U.S. Cl.
CPC ............... *G06T 2207/20072* (2013.01); *G06T 2207/20084* (2013.01); *G06T 2207/30168* (2013.01)

(58) Field of Classification Search
CPC ............. G06T 7/80; G06T 2207/20072; G06T 2207/20084; G06T 2207/30168; G02B 7/36
See application file for complete search history.

(56) References Cited

U.S. PATENT DOCUMENTS

| | | | | |
|---|---|---|---|---|
| 2014/0362276 | A1* | 12/2014 | Hirose | H04N 25/704 348/349 |
| 2016/0266467 | A1 | 9/2016 | Lou et al. | |
| 2018/0154523 | A1* | 6/2018 | Jeong | B25J 19/021 |
| 2021/0360233 | A1* | 11/2021 | Ishtiaq | H04L 65/764 |

FOREIGN PATENT DOCUMENTS

| | | | |
|---|---|---|---|
| JP | 2018163300 | A | 10/2018 |
| WO | 2023/210856 | A1 | 11/2023 |

* cited by examiner

FIG. 4

900

| 910 | 920 | 930 | 940 | 950 |
|---|---|---|---|---|
| SUBJECT DISTANCE | MAGNIFICATION | TEMPERATURE | ACCELERATION | REFERENCE POSITION |
| • • • | • • • | • • • | • • • | • • • |
| • • • | • • • | • • • | • • • | • • • |
| • • • | • • • | • • • | • • • | • • • |
| • • • | • • • | • • • | • • • | • • • |
| • • • | • • • | • • • | • • • | • • • |
| • • • | • • • | • • • | • • • | • • • |
| • • • | • • • | • • • | • • • | • • • |
| • • • | • • • | • • • | • • • | • • • |
| • • • | • • • | • • • | • • • | • • • |
| • • • | • • • | • • • | • • • | • • • |
| • • • | • • • | • • • | • • • | • • • |

IMAGE CAPTURING APPARATUS AND METHOD INCLUDING REFERENCE POSITION ERROR DETERMINATION

CROSS-REFERENCE TO RELATED APPLICATION

This application claims priority from Korean Patent Application No. 10-2023-0172040, filed on Dec. 1, 2023, in the Korean Intellectual Property Office, and all the benefits accruing therefrom under 35 U.S.C. 119, the contents of which in its entirety are herein incorporated by reference.

BACKGROUND

1. Field

Embodiments of the present disclosure relate to an image capturing apparatus and method, and, more particularly, to an image capturing apparatus and method that perform focusing by referencing distance information and image analysis information.

2. Description of Related Art

A camera equipped with a focus lens can perform focusing on a subject by adjusting a position of the focus lens. Focusing can be performed by a user or automatically by the camera.

To perform autofocus (AF), the camera can reference the distance to the subject. That is, the camera performs focusing by adjusting the position of the focus lens according to the distance to the subject. For this purpose, the camera may be provided with relational data that includes the correlation between the distance to the subject and the position of the focus lens. However, since the relational data does not account for information on an installation environment of the camera, focusing based on the relational data may not yield correct results.

Therefore, there is a demand for an embodiment that provides optimal focusing results when focusing is performed by the camera.

SUMMARY

According to embodiments of the present disclosure, an image capturing apparatus and method are provided that perform focusing by referring to distance information and image analysis information.

According to embodiments of the present disclosure, an image capturing apparatus may be provided and include: an imager including a focus lens, the imager configured to generate an image of a subject; a distance determiner configured to determine a distance to the subject; a reference position calculator configured to calculate a reference position of the focus lens based on the distance to the subject; and a controller configured to adjust a focal position of the focus lens in a direction of the reference position, wherein the controller is further configured to determine whether any error is reflected in the reference position based on a calculated sharpness of the image corresponding to the focal position of the focus lens being at the reference position.

According to one or more embodiments of the present disclosure, the controller is further configured to adjust the focal position of the focus lens in pre-set increments in the direction of the reference position.

According to one or more embodiments of the present disclosure, the controller is further configured to adjust the focal position of the focus lens during time intervals between adjacent image frames among a plurality of image frames included in the image.

According to one or more embodiments of the present disclosure, the image capturing apparatus may further include: a sharpness calculator configured to calculate a sharpness of an image frame corresponding to the focal position of the focus lens whenever each of the plurality of image frames is generated.

According to one or more embodiments of the present disclosure, the controller is further configured to move the focus lens during a time interval between when a sharpness of a previous image frame is calculated and when a sharpness of a subsequent image frame is calculated.

According to one or more embodiments of the present disclosure, the controller is further configured to stop adjusting a position of the focus lens based on determining that a calculated sharpness of the image increases and then decreases.

According to one or more embodiments of the present disclosure, the controller is further configured to determine that the error is reflected in the reference position based on the calculated sharpness of the image, corresponding to the focal position of the focus lens being at the reference position, being outside a threshold range.

According to one or more embodiments of the present disclosure, the image capturing apparatus further includes: a target position calculator configured to, based on determining that the error is reflected in the reference position, calculate a target position of the focus lens based on a pattern of sharpness changes corresponding to an adjustment of the focal position of the focus lens.

According to one or more embodiments of the present disclosure, the target position calculator is further configured to form a sharpness graph using corresponding points between multiple selected focal positions of the focus lens and sharpness values calculated for the multiple selected focal positions, respectively, and calculate the target position of the focus lens based on the sharpness graph.

According to one or more embodiments of the present disclosure, the target position calculator is further configured to set the focal position of the focus lens corresponding to a maximum value of the sharpness graph as the target position.

According to one or more embodiments of the present disclosure, the controller is further configured to designate a region within an imaging area of the imager that includes the subject as an exclusion area where use of an artificial intelligence (AI) model is excluded, based on determining that a difference between the reference position of the focus lens, calculated using the AI model, and the target position of the focus lens, calculated using the sharpness graph, exceeds a predetermined threshold.

According to one or more embodiments of the present disclosure, the reference position calculator is further configured to calculate the reference position of the focus lens based on the distance to the subject, magnification of a lens unit, which includes the focus lens, of the imager, and an installation environment of the imager.

According to embodiments of the present disclosure, an image capturing method performed by an image capturing apparatus including a focus lens may be provided. The image capturing method may include: generating an image of a subject; determining a distance to the subject; calculating a reference position of the focus lens based on the distance to the subject; adjusting a focal position of the focus lens in a direction of the reference position; and determining whether any error is reflected in the reference position based on a calculated sharpness of the image corresponding to the focal position of the focus lens being at the reference position.

According to one or more embodiments of the present disclosure, the adjusting includes adjusting the focal position of the focus lens in pre-set increments in the direction of the reference position.

According to one or more embodiments of the present disclosure, the adjusting includes adjusting the focal position of the focus lens during time intervals between adjacent image frames among a plurality of image frames included in the image.

According to one or more embodiments of the present disclosure, the image capturing method further includes: calculating a sharpness of an image frame corresponding to the focal position of the focus lens whenever each of the plurality of image frames is generated.

According to one or more embodiments of the present disclosure, the adjusting includes moving the focus lens during a time interval between when a sharpness of a previous image frame is calculated and when a sharpness of a subsequent image frame is calculated.

According to one or more embodiments of the present disclosure, the determining whether any error is reflected in the reference position includes determining that the error is reflected in the reference position, and the method further includes calculating, based on determining that the error is reflected in the reference position, a target position of the focus lens based on a pattern of sharpness changes corresponding to an adjustment of the focal position of the focus lens.

According to one or more embodiments of the present disclosure, the calculating the target position includes: forming a sharpness graph based on corresponding points between multiple selected focal positions of the focus lens and sharpness values calculated for the multiple selected focal positions, respectively; and calculating the target position of the focus lens based on the sharpness graph.

According to one or more embodiments of the present disclosure, the image capturing method further includes: determining that a difference between the reference position of the focus lens, calculated using an artificial intelligence (AI) model, and the target position of the focus lens, calculated using the sharpness graph, exceeds a predetermined threshold; and setting, based on the determining that the difference exceeds the predetermined threshold, a region within an imaging area of the image capturing apparatus that includes the subject as an exclusion area where the use of an AI model is excluded.

According to embodiments of the present disclosure, a non-transitory computer readable medium including computer code may be provided. The computer code may be configured to, when executed by at least one processor of an image capturing system, cause the image capturing system to: generate an image of a subject; determine a distance to the subject; calculate a reference position of a focus lens of the image capturing system based on the distance to the subject; adjust a focal position of the focus lens in a direction of the reference position; and determine whether any error is reflected in the reference position based on a calculated sharpness of the image corresponding to the focal position of the focus lens being at the reference position.

According to the image capturing apparatus and method of an embodiment of the present disclosure as described above, since focusing is performed by comprehensively referencing distance information and image analysis information, there is an advantage in improving the results of the focusing.

Aspects of and effects achieved by embodiments of the present disclosure are not restricted to those set forth above. The above and other aspects and effects of embodiments of the present disclosure will become more apparent to one of ordinary skill in the art to which the present disclosure pertains by referencing the detailed description of the present disclosure given below.

BRIEF DESCRIPTION OF DRAWINGS

The above and other aspects and features of embodiments of the present disclosure will become more apparent through a detailed description of non-limiting example embodiments thereof with reference to the attached drawings, in which:

FIG. 4 is a diagram illustrating a focal position table according to an embodiment of the present disclosure;

DETAILED DESCRIPTION

Figure 1:
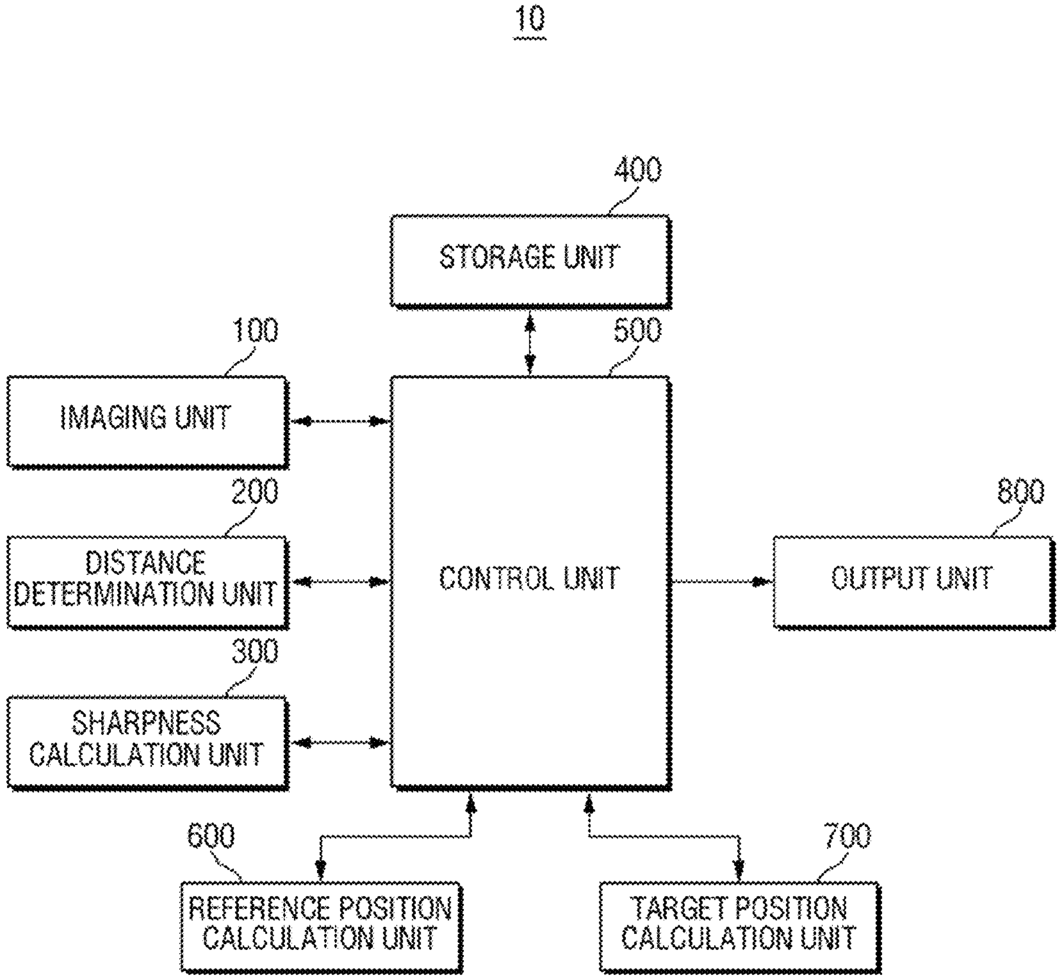
FIG. 1 is a block diagram of an image capturing apparatus according to an embodiment of the present disclosure.

Non-limiting example embodiments of the present disclosure will hereinafter be described in detail with reference to the accompanying drawings. Advantages and features of embodiments (including methods) of the present disclosure, will become clear by referring to the example embodiments described in detail along with the accompanying drawings. However, it should be noted that embodiments of the present disclosure are not limited to the example embodiments described below and can be implemented in various different forms. These example embodiments are provided merely to make the present disclosure complete and to thoroughly inform those skilled in the art of the pertinent technical field about the scope of the present disclosure. The same reference numerals throughout the specification refer to the same components.

Unless defined otherwise, all terms used in this specification, including technical and scientific terms, should be interpreted as having meanings that are commonly understood by those skilled in the technical field to which the present disclosure pertains. Moreover, terms that are defined in commonly used dictionaries should not be construed in an overly idealized or formal sense unless they are explicitly defined otherwise.

Figure 2:
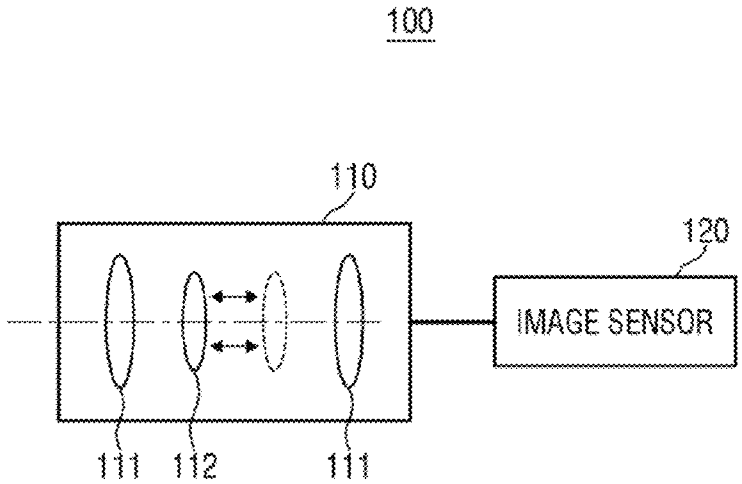
FIG. 2 is a diagram illustrating an imaging unit of FIG. 1.

FIG. 1 is a block diagram of an image capturing apparatus according to an embodiment of the present disclosure, and FIG. 2 is a diagram illustrating an imaging unit of FIG. 1.

Referring to FIG. 1, an image capturing apparatus 10 may include an imaging unit 100 (e.g., an imager), a distance determination unit 200 (e.g., a distance determiner), a sharpness calculation unit 300 (e.g., a sharpness calculator), a storage unit 400 (e.g., a storage), a control unit 500 (e.g., a controller), a reference position calculation unit 600 (e.g., a reference position calculator), a target position calculation unit 700 (e.g., a target position calculator), and an output unit 800 (e.g., an outputter).

The imaging unit 100 may generate an image of a subject. For this purpose, as illustrated in FIG. 2, the imaging unit 100 (e.g., the imager) may include a lens unit 110 and an image sensor 120. Here, the image generated by the imaging unit 100 may be either a video or a still image.

The lens unit 110 may receive light from the subject and the background. The lens unit 110 may include a plurality of lenses (e.g., lenses 111 and a focus lens 112). The lenses (e.g., the lenses 111 and the focus lens 112) are aligned along the optical axis of the lens unit 110 and may sequentially transmit light. The lens unit 110 may include various lenses (e.g., the lenses 111 and the focus lens 112) for focusing light, sharpening the subject's outline, enhancing colors, reducing distortion of the subject's shape, or magnifying the subject. Additionally, the lens unit 110 may include a focus lens 112. The focus lens 112 may move in the direction parallel to the optical axis of the lens unit 110. The focal distance to the subject may change depending on the position of the focus lens 112.

According to embodiments of the present disclosure, the imaging unit 100 may further include at least one actuator that is configured to move the focus lens 112 in the direction parallel to the optical axis of the lens unit 110 to change the focal distance.

The image sensor 120 may generate an image using the light received through the lens unit 110. For example, a charge-coupled device (CCD) or complementary metal-oxide-semiconductor (CMOS) device may serve as the image sensor 120.

According to embodiments of the present disclosure, the imaging unit 100 may be provided with a direction switching means (e.g., at least one actuator) for changing the shooting direction. The direction switching means may rotate the imaging unit 100 in the pan or tilt direction to switch the shooting direction. The direction switching means may switch the shooting direction of the imaging unit 100 based on pre-set control commands or user commands.

Referring again to FIG. 1, the distance determination unit 200 may determine the distance to the subject. The distance determination unit 200 may determine the distance to the subject using laser, ultrasound, or infrared rays. For this purpose, the distance determination unit 200 may irradiate laser, ultrasound, or infrared rays in the direction parallel to the optical axis of the imaging unit 100 and determine the distance to the subject by using reflected signals from the subject. Alternatively, the distance determination unit 200 may determine the distance to the subject by analyzing the image using an artificial intelligence (AI) model. A detailed explanation of how to determine the distance to the subject using an AI model will be provided later with reference to FIGS. 12 through 14.

According to embodiments of the present disclosure, distance determination unit 200 (e.g., the distance determiner) may include or be implemented by at least one sensor (e.g., a laser sensor, an ultrasound sensor, and/or an infrared ray sensor), at least one processor, and/or computer code to perform the functions of the distance determination unit 200.

The sharpness calculation unit 300 may calculate the sharpness of the image. For example, the sharpness calculation unit 300 may calculate the sharpness by analyzing the frequency of the image. Here, the sharpness of the image may represent the contrast of the image.

According to embodiments of the present disclosure, the sharpness calculation unit 300 (e.g., the sharpness calculator) may include or be implemented by at least one processor and/or computer code to perform the functions of the sharpness calculation unit 300.

The storage unit 400 may temporarily or permanently store the image generated by the imaging unit 100. Additionally, the storage unit 400 may store the focal position of the focus lens 112 for an exclusion area and a focal position table 900 of FIG. 4, which will be described later.

According to embodiments of the present disclosure, the storage unit 400 (e.g., the storage) may be one or more memory units or memories configured to store digital information.

The reference position calculation unit 600 may calculate the reference position of the focus lens 112 by referring to the distance to the subject determined by the distance determination unit 200. Here, the reference position indicates the focal position of the focus lens 112 that enhances the sharpness of the image. The focal position table 900 may include the relationship between the distance to the subject and the reference position. The reference position calculation unit 600 may extract the reference position corresponding to the distance to the subject from the focal position table 900.

The reference position calculation unit 600 may calculate the reference position by referring to not only the distance to the subject but also the installation environment of the imaging unit 100. This will be described later in detail with reference to FIG. 3.

According to embodiments of the present disclosure, the reference position calculation unit 600 (e.g., the reference position calculator) may include or be implemented by at least one processor and/or computer code to perform the functions of the reference position calculation unit 600.

As the position of the focus lens 112 is adjusted, the sharpness of the image may change. The target position calculation unit 700 may calculate the target position of the focus lens 112, which is expected to provide the maximum sharpness of the image. Specifically, the target position calculation unit 700 may generate a sharpness graph by using the corresponding points between a plurality of selected focal positions of the focus lens 112 and a plurality of sharpness values calculated at the respective selected focal positions, and may calculate the target position of the focus lens 112 using the sharpness graph. A detailed explanation of the operation of the target position calculation unit 700 will be provided later with reference to FIGS. 6 through 8.

According to embodiments of the present disclosure, the target position calculation unit 700 (e.g., the target position calculator) may include or be implemented by at least one processor and/or computer code to perform the functions of the target position calculation unit 700.

The output unit 800 may output the image generated after focusing is adjusted according to the reference position or the target position. For example, the output unit 800 may visually display the focus-adjusted image. Additionally, in some embodiments of the present disclosure, the output unit 800 may include communication functionality to transmit the focused-adjusted image. A user may receive the image transmitted via the output unit 800 on their terminal for viewing.

According to embodiments of the present disclosure, the output unit 800 (e.g., the outputter) may include an output interface.

The control unit 500 may perform overall control of the imaging unit 100, the distance determination unit 200, the sharpness calculation unit 300, the storage unit 400, the reference position calculation unit 600, the target position calculation unit 700, and the output unit 800. Additionally, the control unit 500 may adjust the position of the focus lens 112 based on the reference position and the target position. When the reference position is calculated by the reference position calculation unit 600, the control unit 500 may adjust (e.g., by controlling at least one actuator) the position of the focus lens 112 toward the reference position. Furthermore, when the target position is calculated by the target position calculation unit 700, the control unit 500 may adjust the position of the focus lens 112 toward the target position.

Particularly, the control unit 500 may adjust the focal position of the focus lens 112 in pre-set increments toward the reference position. For example, instead of moving the focus lens 112 to the reference position in one step, the lens may move incrementally over several steps. A detailed explanation of the incremental movement of the focus lens 112 will be provided later with reference to FIG. 5.

The control unit 500 may reference the sharpness of the image calculated at the reference position to determine whether error is reflected in the reference position. Due to various factors such as the manufacturing environment, installation environment, and operational environment of the image capturing apparatus 10, error may be reflected in the reference position of the focus lens 112, which is calculated by referencing the distance to the subject. In such cases, even if the focus lens 112 is moved to the reference position, the image may not achieve maximum sharpness in a comparative embodiment. The control unit 500 determines whether error is reflected in the reference position and decides whether to calculate the target position based on the results of the determination. That is, if the control unit 500 determines that error is reflected in the reference position, it enables the calculation of the target position. Conversely, if the control unit 500 determines that no error is reflected in the reference position, it prevents the target position from being calculated. Meanwhile, in some embodiments of the present disclosure, the control unit 500 may allow the target position to be calculated even if it determines that no error is reflected in the reference position.

According to embodiments of the present disclosure, the control unit 500 (e.g., the controller) may include or be implemented by at least one processor and/or computer code to perform the functions of the control unit 500.

According to one or more embodiments, the control unit 500 may be implemented by at least one processor such as a central processing unit (CPU), graphic processing unit (GPU) and/or another type of microprocessor, and an internal memory to perform the above-described functions by loading corresponding computer code or instructions stored in the storage unit 400 to the internal memory and execute the computer code or instructions. Further, in a case where at least one of the distance determination unit 200, the sharpness calculation unit 300, the reference position calculation unit 600, and the target position calculation unit 700 is implemented by computer code or instructions which may be stored in the storage unit 400, the control unit 500 may load the computer code or instructions to the internal memory and execute the computer code or instructions to perform the above-described functions of these components. Alternatively or additionally, at least one of the distance determination unit 200, the sharpness calculation unit 300, the reference position calculation unit 600, and the target position calculation unit 700 may be implemented by dedicated hardware including one or more of logic gates or circuits, registers, memories, interface circuits, etc. configured to perform the above-described functions in association with the control unit 500.

Figure 3:
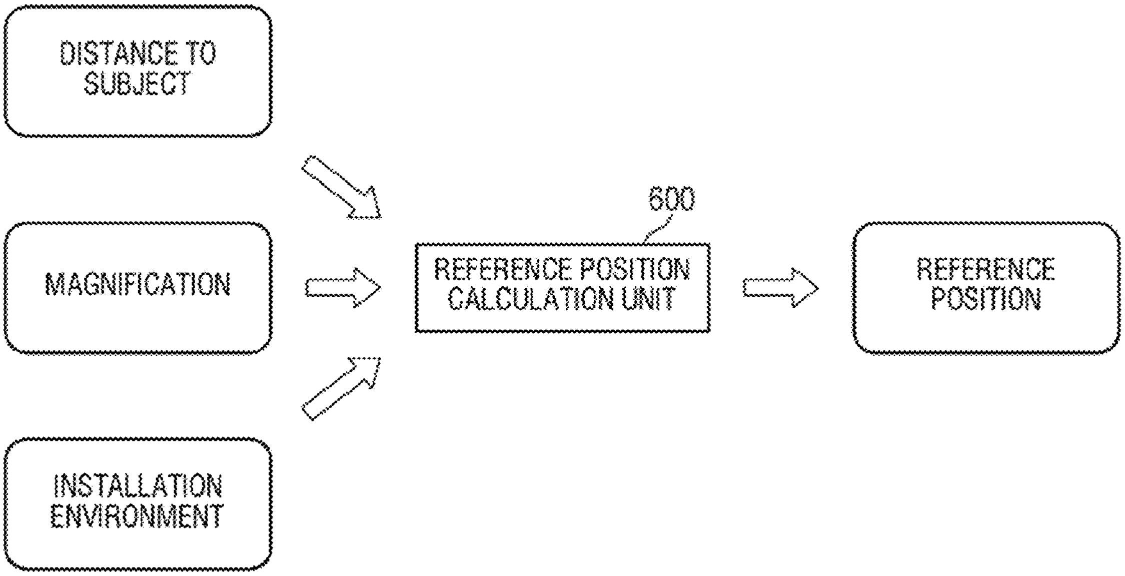
FIG. 3 is a diagram for explaining functions of a reference position calculation unit according to an embodiment of the present disclosure.

FIG. 3 is a diagram for explaining a function of the reference position calculation unit according to an embodiment of the present disclosure, and FIG. 4 is a diagram showing the focal position table according to an embodiment of the present disclosure.

Referring to FIG. 3, the reference position calculation unit 600 may calculate the reference position by referring to the distance to the subject, magnification, and installation environment.

The reference position calculation unit 600 may calculate the reference position by referring to the focal position table 900, which includes the correlation between the distance to the subject, magnification, the installation environment of the imaging unit 100, and the reference position of the focus lens 112. As shown in FIG. 4, the focal position table 900 may include a subject distance field 910, a magnification field 920, a temperature field 930, an acceleration field 940, and a reference position field 950.

The subject distance field 910 may indicate the distance to the subject. The magnification field 920 may indicate the magnification of the lens unit 110. The temperature field 930 may indicate the ambient temperature of the location where the imaging unit 100 is installed. The acceleration field 940 may indicate the gravitational acceleration acting on the imaging unit 100. The reference position field 950 may indicate the reference position of the focus lens 112. The focal position table 900 may specify reference positions for various combinations of subject distance, magnification, temperature, and acceleration.

The reference position calculation unit 600 may apply the distance to the subject determined by the distance determination unit 200, the magnification input by the user, the ambient temperature around the imaging unit 100, and the acceleration acting on the imaging unit 100 to the focal position table 900 to extract the corresponding reference position. Here, the ambient temperature around the imaging unit 100 and the acceleration acting on the imaging unit 100 may be used to assess the installation environment of the imaging unit 100. Particularly, the acceleration acting on the imaging unit 100 may be used to assess the installation orientation of the imaging unit 100. The image capturing apparatus 10 may include a separate means for determining the installation environment of the imaging unit 100.

Figure 5:
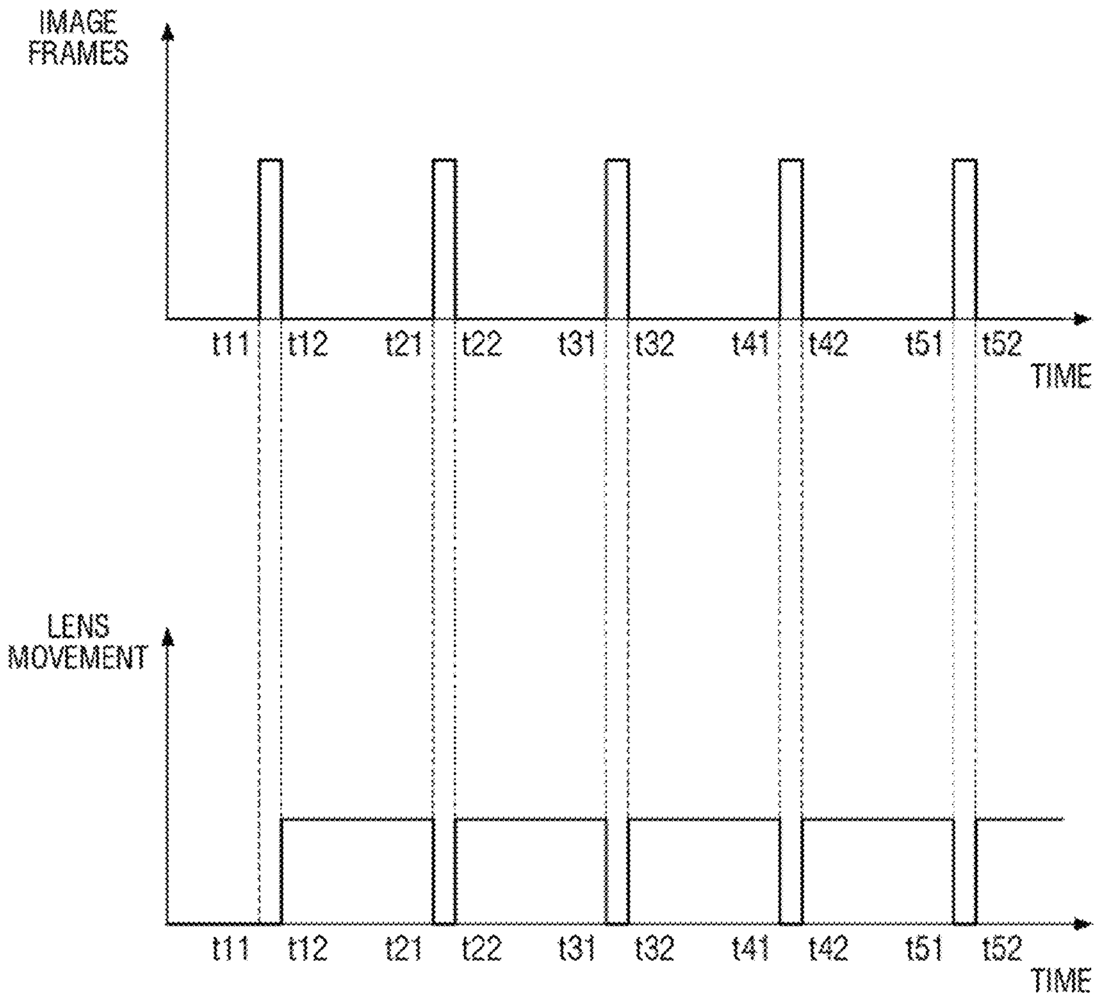
FIG. 5 is a diagram for explaining a movement pattern of a focus lens according to an embodiment of the present disclosure.

FIG. 5 is a diagram for explaining a movement pattern of the focus lens according to an embodiment of the present disclosure.

Referring to FIG. 5, the control unit 500 may move the focus lens 112 during the time intervals between adjacent image frames among a plurality of image frames included in the image so that the focal position of the focus lens 112 may be adjusted. The pre-set increments for adjustment of the focal position of the focus lens 112, described above, may be understood to correspond to the time intervals between the adjacent image frames.

The image may include a plurality of image frames. Each of the image frames may be sequentially generated by the image sensor 120. FIG. 5 shows that image frames are generated at times t11, t21, t31, t41, and t51.

The number of image frames generated per unit time may vary depending on the performance of the image sensor 120. For example, the image sensor 120 may generate 30 image frames per second. In this case, the time intervals between the adjacent image frames may be approximately 33.3 ms. Referring to FIG. 5, the time intervals between the times t11 and t21, times t21 and t31, times t31 and t41, and times t41 and t51 may each be approximately 33.3 ms.

The sharpness calculation unit 300 may calculate the sharpness of an image frame corresponding to each focal position whenever the image frame is generated. At this time, the sharpness calculation unit 300 may calculate the sharpness of the image during a predetermined time interval after the image frame is generated. Referring to FIG. 5, the sharpness calculation unit 300 may calculate the sharpness of the image during the time intervals of times t11 to t12, times t21 to t22, times t31 to t32, times t41 to t42, and times t51 to t52. That is, the sharpness calculation unit 300 may calculate the sharpness of the image frame generated at the time t11 during the time interval of times t11 to t12, the sharpness of the image frame generated at the time t21 during the time interval of times t21 to t22, the sharpness of the image frame generated at the time t31 during the time interval of times t31 to t32, and may repeat these processes.

The control unit 500 may move the focus lens 112 during the time intervals between the adjacent image frames. Specifically, the control unit 500 may move the focus lens 112 between the time when the sharpness of a previous image frame is calculated and the time when a subsequent image frame is generated. Referring to FIG. 5, the control unit 500 may move the focus lens 112 during the time intervals of the times t12 to t21, times t22 to t31, times t32 to t41, and times t42 to t51.

When the movement of the focus lens 112 to the reference position is complete, the control unit 500 may refer to the sharpness of the image calculated at the reference position to determine whether error is reflected in the reference position. For example, if the sharpness of the image calculated by the sharpness calculation unit 300 falls outside a threshold range that can be calculated at the reference position, the control unit 500 may determine that error is reflected in the reference position.

If it is determined that no error is reflected in the reference position, the control unit 500 may finely adjust the focal position of the focus lens 112 to perform contrast autofocus (AF) or may terminate the adjustment of the focal position of the focus lens 112. On the other hand, if it is determined that error is reflected in the reference position, the control unit 500 may cause the target position calculation unit 700 to calculate the target position.

As described above, the focal position of the focus lens 112 may be adjusted in the pre-set increments toward the reference position. The target position calculation unit 700 may calculate the target position of the focus lens 112 by referring to the pattern of sharpness changes corresponding to the adjustment of the focal position of the focus lens 112. As the focus lens 112 moves and the focal position is adjusted, the sharpness of the image may change, and, through this, the correspondence between the focal position and the sharpness may be established. The correspondence between the focal position and the sharpness may be used to form corresponding points, which will be described later. The target position calculation unit 700 may calculate the target position using the corresponding points.

Figure 6:
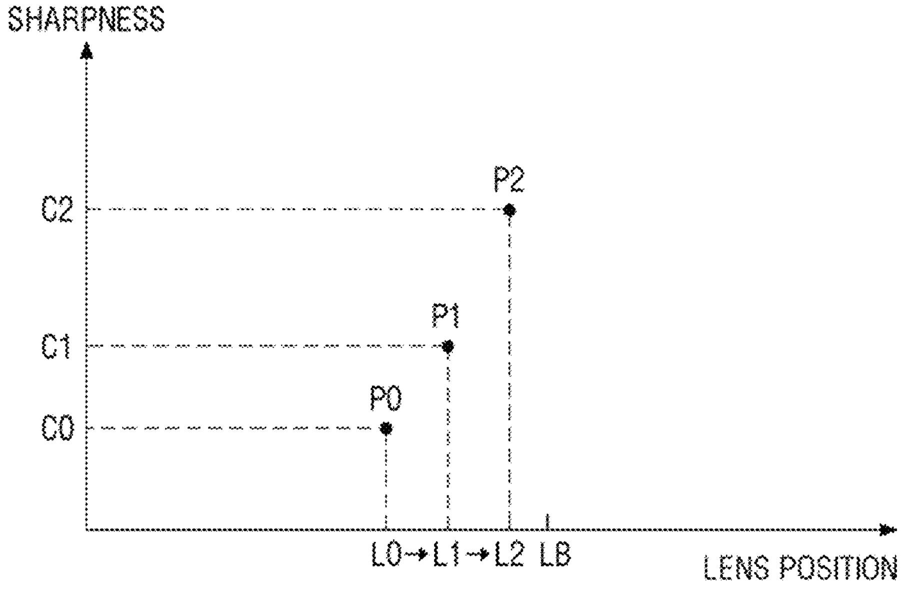
FIG. 6 is a diagram for explaining how corresponding points are generated according to an embodiment of the present disclosure.
Figure 7:
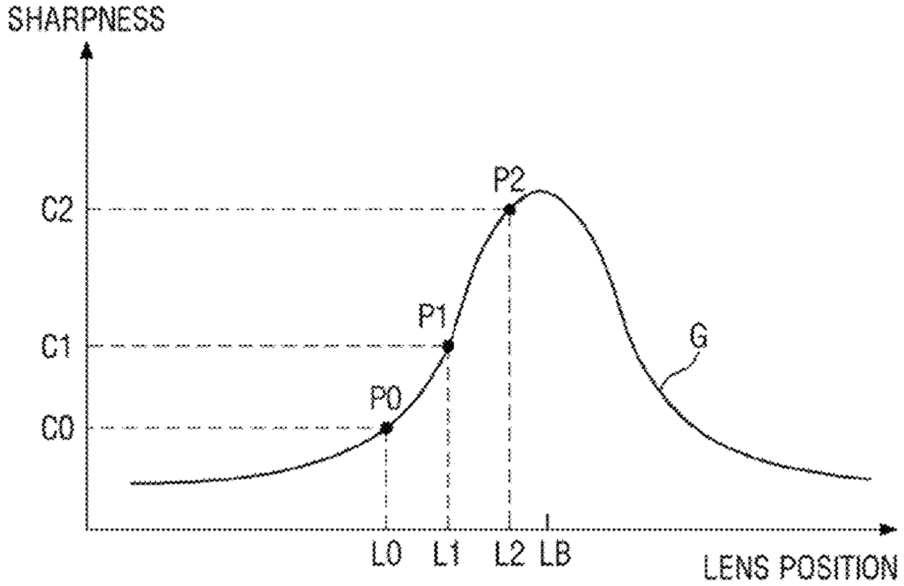
FIG. 7 is a diagram showing how a sharpness graph is generated using corresponding points according to an embodiment of the present disclosure.
Figure 8:
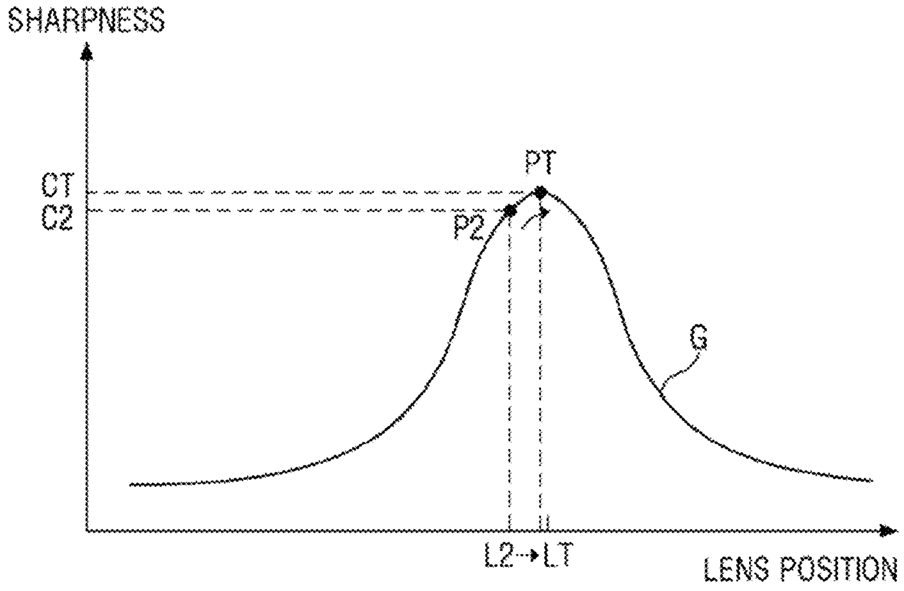
FIG. 8 is a diagram for explaining how a target position that provides maximum sharpness is calculated using the sharpness graph according to an embodiment of the present disclosure.

FIG. 6 is a diagram for explaining how corresponding points are generated according to an embodiment of the present disclosure, FIG. 7 is a diagram illustrating how a sharpness graph is generated using the corresponding points, and FIG. 8 is a diagram for explaining how a target position providing maximum sharpness is calculated using the sharpness graph according to an embodiment of the present disclosure.

The control unit 500 may move the focus lens 112 in the direction toward a reference position LB. Accordingly, the focal position of the focus lens 112 may be adjusted from a current position (e.g., a focal position L0) to a reference position LB.

As described above, the control unit 500 may move the focus lens 112 during the time intervals between the adjacent image frames. Accordingly, the focus lens 112 may repeat moving and stopping. FIG. 6 shows that the focus lens 112 moves from the current position (e.g., the focal position L0) to a focal position L1 during a first time interval and from the focal position L1 to a focal position L2 during a second time interval.

At each focal position, the sharpness calculation unit 300 may calculate the sharpness of the image. As the focus lens 112 moves toward the reference position LB, the sharpness may gradually increase. A sharpness value C0 is calculated at the focal position L0, a sharpness value C1 is calculated at the focal position L1, and a sharpness value C2 is calculated at the focal position L2. Through this, a correspondence between the focal position of the focus lens 112 and the sharpness of the image is formed, and corresponding points P0, P1, and P2 for the combinations of the focal positions L0, L1, and L2 and the sharpness values C0, C1, and C2 may be formed. That is, the corresponding point P0 corresponds to the combination of the sharpness value L0 and the focal position C0, the corresponding point P1 corresponds to the combination of the sharpness value L1 and the focal position C1, and the corresponding point P2 corresponds to the combination of the sharpness value L2 and the focal position C2.

Referring to FIGS. 7 and 8, the target position calculation unit 700 may calculate the target position of the focus lens 112 by referring to the pattern of sharpness changes corresponding to the adjustment of the focal position of the focus lens 112. Specifically, the target position calculation unit 700 may generate a sharpness graph G using the corresponding points between multiple selected focal positions of the focus lens 112 and sharpness values calculated for the respective selected focal positions, and may calculate the target position of the focus lens using the sharpness graph G.

The target position calculation unit 700 may generate the sharpness graph G using the corresponding points P0, P1, and P2. The sharpness graph G generated by the target position calculation unit 700 may be a two-dimensional (2D) function graph. To generate a 2D function graph, the number of corresponding points may be three or more.

The sharpness graph G, which is 2D, may have a maximum value PT. Here, the maximum value PT of the sharpness graph G may be predicted as the maximum sharpness of the image.

The target position calculation unit 700 may set the focal position of the focus lens 112 corresponding to the maximum value PT of the sharpness graph G as a target position LT, and may move the focus lens 112 to the target position LT. After the focus lens 112 has moved to the target position LT, the control unit 500 may finely adjust the focal position of the focus lens 112 to perform contrast AF or may terminate the adjustment of the focal position of the focus lens 112.

Figure 9:
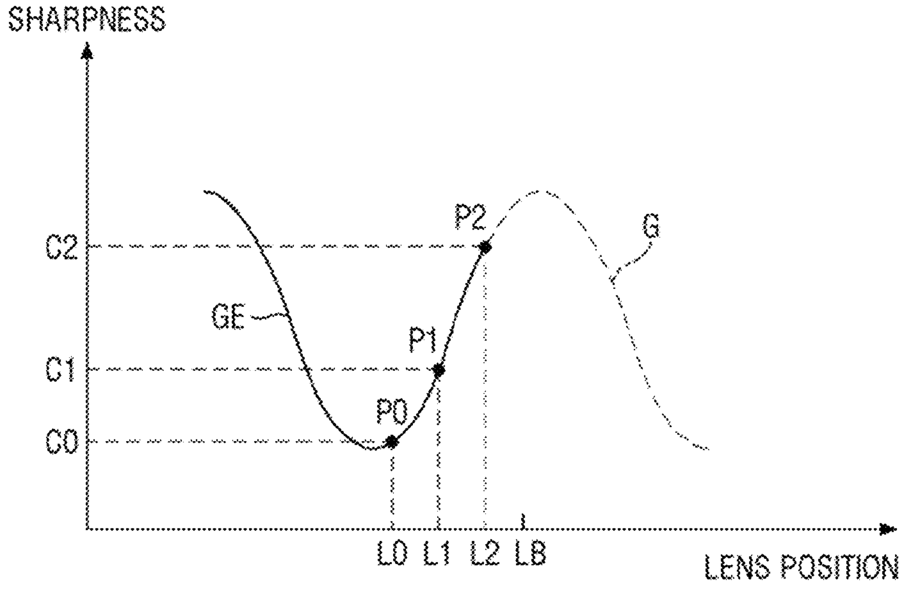
FIG. 9 is a diagram for explaining how an error sharpness graph is generated according to an embodiment of the present disclosure.
Figure 10:
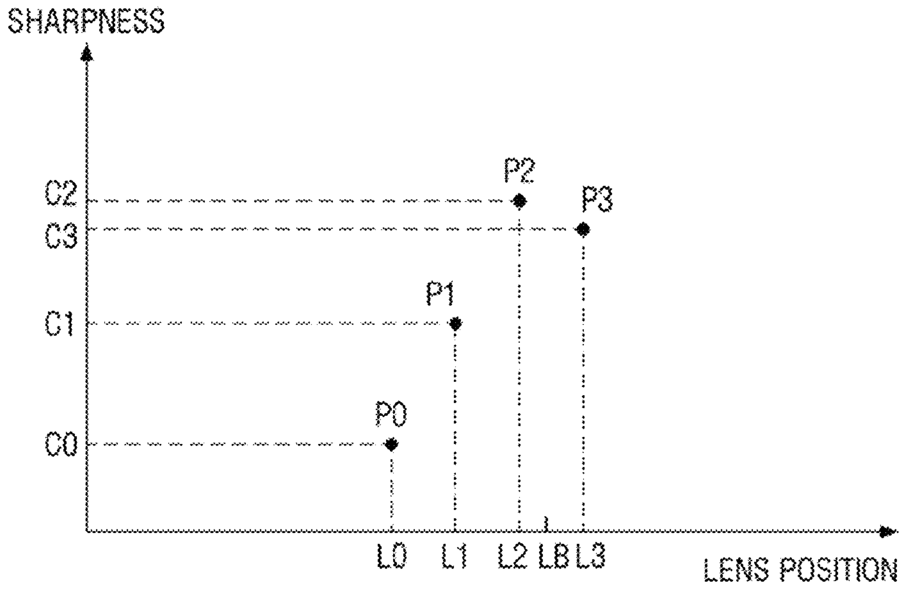
FIG. 10 is a diagram for explaining how corresponding points are generated based on increasing and then decreasing sharpness according to an embodiment of the present disclosure.
Figure 11:
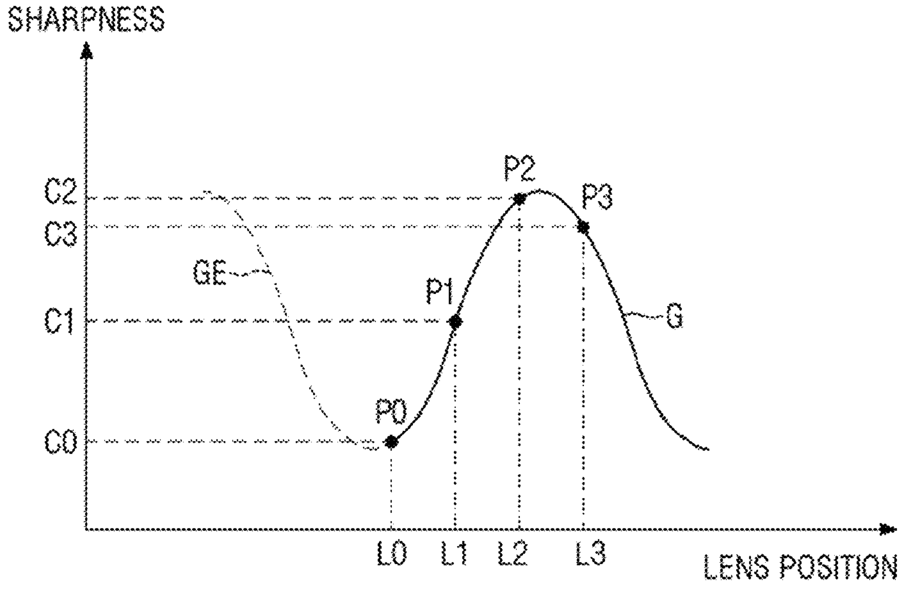
FIG. 11 is a diagram for explaining how a sharpness graph is generated using the corresponding points of FIG. 10 according to an embodiment of the present disclosure.

FIG. 9 is a diagram for explaining how an error sharpness graph is generated according to an embodiment of the present disclosure, FIG. 10 is a diagram for explaining how corresponding points are generated based on increasing and then decreasing sharpness according to an embodiment of the present disclosure, and FIG. 11 is a diagram illustrating how a sharpness graph is generated using the corresponding points of FIG. 10 according to an embodiment of the present disclosure.

Referring to FIG. 9, if corresponding points are not selected properly, a normal sharpness graph G may not be generated and, instead, an error sharpness graph GE may be generated.

The error sharpness graph GE may be a 2D function graph that has a minimum value. If the error sharpness graph GE is generated, it may become impossible to calculate the target position LT that maximizes the sharpness of the image.

Referring to FIGS. 10 and 11, the target position calculation unit 700 may generate a 2D sharpness graph G that has a maximum value.

To enable the target position calculation unit 700 to generate a sharpness graph G that has a maximum value, the control unit 500 may adjust the position of the focus lens 112 until the sharpness of the image increases and then decreases. Referring to FIG. 10, the control unit 500 may move the focus lens 112 in the direction toward the reference position LB. While the focus lens 112 moves from the focal position L0 to the focal position L2, the sharpness may increase from the sharpness value C0 to the sharpness value C2. As the pattern of the sharpness decreasing is not formed, the control unit 500 may continue to move the focus lens 112. When the focal position of the focus lens 112 is L3, the sharpness may be the sharpness value C3, which is lower than the previous sharpness value (e.g., the sharpness value C2).

If it is confirmed that the sharpness of the image increases and then decreases, the control unit 500 may send multiple corresponding points that include information on the increase and decrease in sharpness to the target position calculation unit 700. For example, the control unit 500 may send corresponding points P1, P2, and P3 to the target position calculation unit 700. Accordingly, the target position calculation unit 700 may form the sharpness graph G using the corresponding points P1, P2, and P3. In this case, the sharpness graph G may be a 2D function graph that has a maximum value.

The target position calculation unit 700 may set the focal position of the focus lens 112 corresponding to the maximum value of the sharpness graph G as the target position LT, and may move the focus lens 112 to the target position LT. After the focus lens 112 has moved to the target position LT, the control unit 500 may finely adjust the focal position of the focus lens 112 to perform contrast AF or may terminate the adjustment of the focal position of the focus lens 112.

Figure 12:
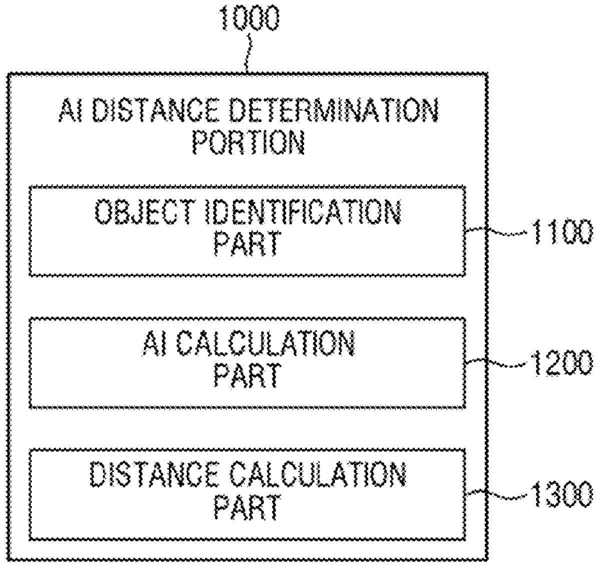
FIG. 12 is a block diagram of an artificial intelligence (AI) distance determination portion according to an embodiment of the present disclosure.
Figure 13:
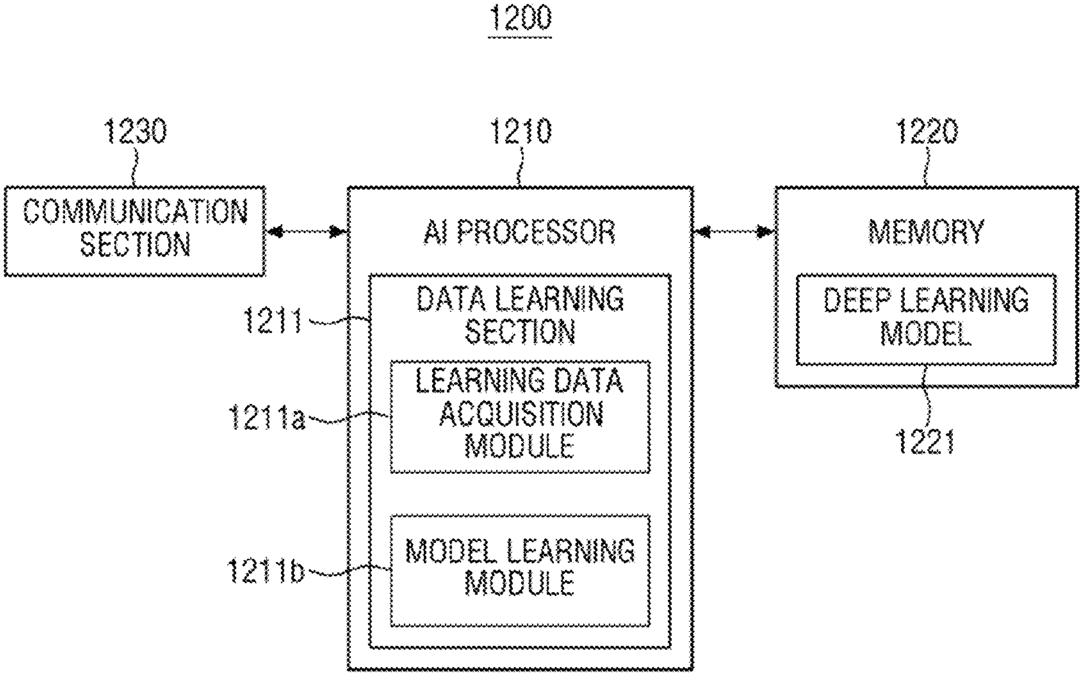
FIG. 13 is a block diagram of an AI calculation part according to an embodiment of the present disclosure.
Figure 14:
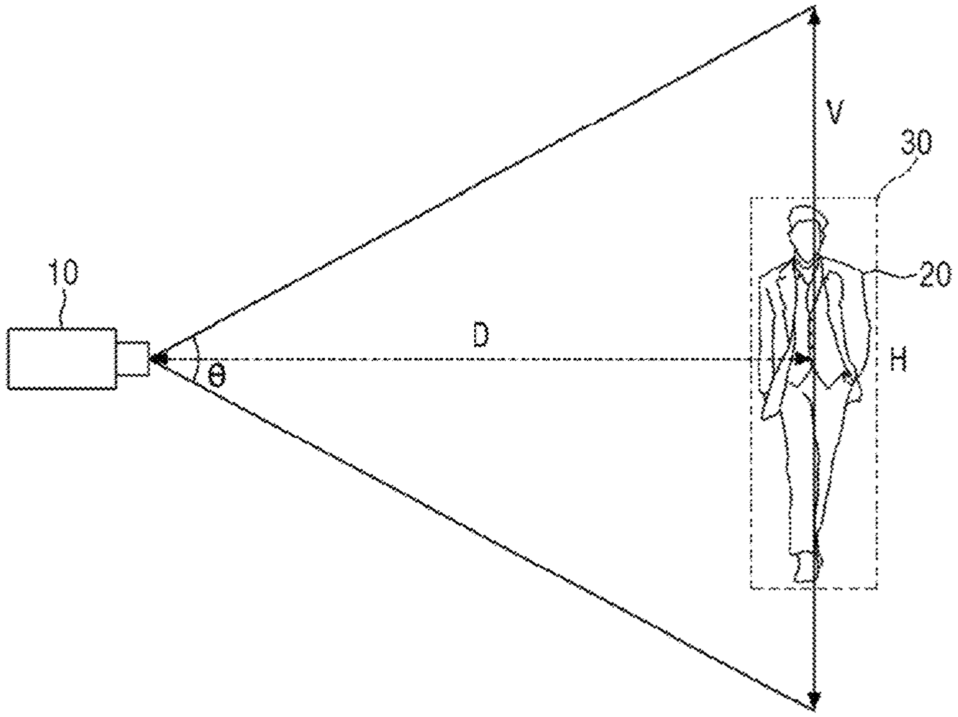
FIG. 14 is a diagram for explaining the operation of a distance calculation part according to an embodiment of the present disclosure.

FIG. 12 is a block diagram of an AI distance determination portion according to an embodiment of the present disclosure, FIG. 13 is a block diagram of an AI calculation part according to an embodiment of the present disclosure, and FIG. 14 is a diagram for explaining an operation of a distance calculation part according to an embodiment of the present disclosure.

The distance determination unit 200 may include an AI distance determination portion 1000 (e.g., an AI distance determiner). The AI distance determination portion 1000 may determine the distance to the subject by analyzing the image using an AI model.

The AI distance determination portion 1000 may be configured to include an object identification part 1100 (e.g., an object identifier), an AI calculation part 1200 (e.g., an AI calculator), and a distance calculation part 1300 (e.g., a distance calculator).

The object identification part 1100 may identify an object included in the image captured by the imaging unit 100. Here, the term "object" refers to a person, an inanimate object, or other entity distinguishable from the background of the image and having independent movement within the image. The identification of the object may be performed using a deep learning algorithm in the AI calculation part 1200.

The object identified by the object identification part 1100 may be generally defined by object identification information, object type, object probability, and object size. The object identification information may be arbitrary data indicating the identity of the object, and the object type may be a class distinguishable by humans, such as a person, animal, or vehicle class. Additionally, the object probability may indicate the accuracy, or probability, that the object has been correctly identified. For example, if the type of a particular object is a person and the object probability is 80%, it means there is an 80% probability that the object is a person.

Referring to FIGS. 12 and 13, the AI calculation part 1200 may perform AI processing for the object identification part 1100 of the object identification part 1100.

The AI calculation part 1200 may be a computing device capable of training a neural network and may be implemented in various forms of electronic devices, such as a server, a desktop personal computer (PC), a laptop, or a tablet PC.

The AI calculation part 1200 may be configured to include an AI processor 1210, a memory 1220, and a communication section 1230.

The AI processor 1210 may train a neural network using programs stored in the memory 1220. Particularly, the AI processor 1210 may train a neural network to recognize objects in images. Here, the neural network for object recognition may be designed to simulate the structure of the human brain on a computer, and may include multiple network nodes with weights that simulate the neurons in the human neural network. The multiple network nodes may exchange data according to their connection relationships, simulating the synaptic activities where neurons exchange signals via synapses. The neural network may include a deep learning model developed from a neural network model. In a deep learning model, the multiple network nodes may be located in different layers and exchange data according to convolutional connection relationships. Examples of the neural network model include various deep learning technologies such as Deep Neural Network (DNN), Convolutional DNN (CNN), Recurrent Neural Network (RNN), Restricted Boltzmann Machines (RBM), and Deep Belief Network (DBN). Deep Q-Networks can be applied in fields such as computer vision, speech recognition, natural language processing, speech processing, and signal processing.

Meanwhile, the AI processor 1210 that performs these functions may be a general-purpose processor (e.g., a central processing unit (CPU)) or an AI-dedicated processor (e.g., a graphics processing unit (GPU)) for AI training. The memory 1220 may store various programs and data for the operation of the AI calculation part 1200. The memory 1220 may be implemented as a non-volatile memory, volatile memory, flash memory, hard disk drive (HDD), or solid-state drive (SSD). The memory 1220 may be accessed by the AI processor 1210, and supports read, write, edit, delete, and update operations on data by the AI processor 1210. Additionally, the memory 1220 may store a neural network model (or deep learning model) 1221, generated through the training algorithm for classifying and recognizing data according to one embodiment of the present disclosure.

The AI processor 1210 may include a data learning section 1211 for training a neural network for classifying and recognizing data. The data learning section 1211 may learn the criteria for which training data to use and how to classify and recognize data using the training data. The data learning section 1211 may acquire the training data to be used for learning and apply the acquired training data to the deep learning model 1221 to train the deep learning model 1221.

The data learning section 1211 may be manufactured in the form of at least one hardware chip of the AI calculation part 1200. For example, the data learning section 1211 may be manufactured in the form of an AI-dedicated hardware chip. The data learning section 1211 may be manufactured as part of a general-purpose processor (e.g., a CPU) or a dedicated graphics processor (e.g., a GPU) of the AI calculation part 1200. Additionally, the data learning section 1211 may be implemented as software. When the data learning section 1211 is implemented as a software module (or a program module containing instructions), the software module may be stored on a computer-readable medium. In this case, at least one software module may be provided by an operating system (OS) or an application.

The data learning section 1211 may include a learning data acquisition module 1211*a* and a model learning module 1211*b*.

The learning data acquisition module 1211*a* may acquire the training data requested for the neural network model for classifying and recognizing data. For example, the learning data acquisition module 1211*a* may acquire objects and/or sample data to be input as training data into the neural network model.

The model learning module 1211*b* may train the neural network model using the acquired training data to establish the criteria for how the neural network model classifies specific data. In this case, the model learning module 1211*b* may train the neural network model through supervised learning, where at least part of the training data is used as the basis for the classification criteria. Alternatively, the model learning module 1211*b* may train the neural network model through unsupervised learning, where the neural network model learns the classification criteria by itself using training data without supervision. The model learning module 1211*b* may also train the neural network model through reinforcement learning, using feedback to verify the accuracy of the results of learning-based situation assessment. Additionally, the model learning module 1211*b* may train the neural network model using a learning algorithm that includes an error back-propagation or gradient descent method.

Once the neural network model is trained, the model learning module 1211*b* may store the trained neural network model in the memory 1220. The model learning module 1211*b* may store the trained neural network model in the memory 1220 of a server connected to the AI calculation part 1200 via a wired or wireless network.

The communication section 1230 may output the results of processing by the AI processor 1210.

Referring to FIGS. 12 and 14, the distance calculation part 1300 may calculate the distance between the image capturing apparatus 10 and an object 20 identified by the object identification part 1100 based on the proportion of the object 20 within the image.

FIG. 14 illustrates the object 20 being captured by the image capturing apparatus 10. In FIG. 14, the object 20 is depicted as a person.

In FIG. 14, the value to be calculated is a distance D between the image capturing apparatus 10 and the object 20. In FIG. 14, the vertical field of view (FOV) θ of the image capturing apparatus 10 is shown, and the vertical size V that can be captured by the image capturing apparatus 10 based on the vertical FOV θ is shown. Additionally, the object 20, identified by the object identification part 1100, may be recognized in the form of a box 30, and the vertical size H of the object 20 is shown.

The vertical FOV θ of the image capturing apparatus 10 may be obtained from specification information of the image capturing apparatus 10, and the specification information may be stored in advance in the storage unit 400.

The ratio of the vertical size V that can be captured by the imaging unit 100 to the vertical size H of the object 20 may be considered the same as the ratio of the size of the object 20 within the image captured by the imaging unit 100 to the total vertical size of the corresponding image. Therefore, assuming that the vertical size of the image is 100, and the proportion of the object 20 within the image is P (%), Equation 1 below is established.

$$H/V = P/100 \quad \text{(Equation 1)}$$

Additionally, the distance D and the vertical size V satisfy Equation 2 below.

$$V = 2 \times D \times \tan(\theta/2) \quad \text{(Equation 2)}$$

Here, θ represents the vertical FOV of the image capturing apparatus 10, particularly, the vertical FOV of the image capturing apparatus 10 at a specific magnification. Therefore, by combining Equations 1 and 2, the distance D, which is the value to be calculated, may be derived as shown below in Equation 3.

$$D = 50H/(P \times \tan(\theta/2)) \quad \text{(Equation 3)}$$

In Equation 3, the vertical FOV θ may be identified from the specifications of the image capturing apparatus 10, and the size ratio P of the object 20 may be determined through the image captured by the imaging unit 100. For example, if the number of vertical pixels in the captured image is 1080, and the number of vertical pixels occupied by the object 20 is 216, the size ratio P of the object 20 may be 20.

Additionally, if the object 20 is a person and the vertical FOV θ is 30°, and the height H of the person is approximately 1 to 2 meters, the minimum of the distance D may be 9.25 meters, and the maximum of the distance D may be 18.5 meters.

FIG. 14 illustrates how the distance D between the image capturing apparatus 10 and the object 20 is calculated based on the total size of the object 20, such as the height of a person. However, as previously mentioned, the height of a person may vary greatly, and even the same person's height may differ depending on posture. In such cases, the vertical size of a person's face may be applied to Equation 3 to calculate the distance D. Particularly, since facial features such as the eyes, nose, and mouth are well-defined, and their size variances are relatively small, more accurate results can be obtained.

Meanwhile, if a part of the object 20 with a more standardized size than a person's face is used, the calculation accuracy of the distance D can be further improved. For example, license plates on vehicles have standardized sizes in both horizontal and vertical directions according to the regulations of different countries. Therefore, the vertical size of a vehicle's license plate may be applied to Equation 3 to calculate the distance D. In this case, the calculation accuracy of the distance D can be higher than in other embodiments.

Figure 15:
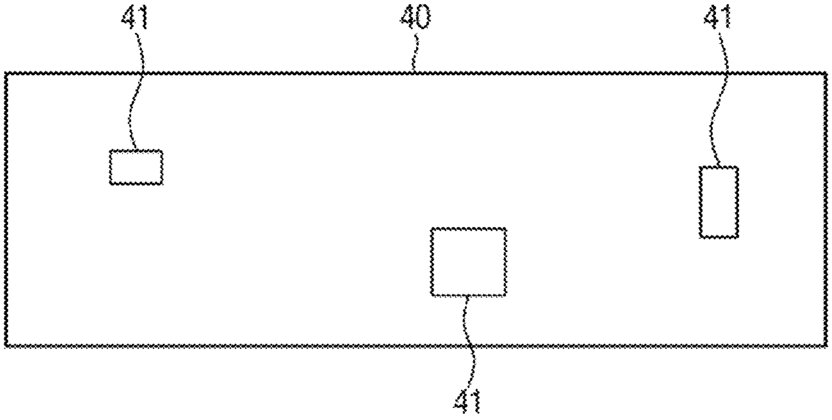
FIG. 15 is a diagram for explaining inclusion of an exclusion area in an imaging area of the imaging unit according to an embodiment of the present disclosure.

FIG. 15 is a diagram illustrating the inclusion of an exclusion area in the imaging area of the imaging unit according to an embodiment of the present disclosure.

Referring to FIG. 15, an imaging area 40 of the imaging unit 100 may include an exclusion area 41.

As described above, the distance to the subject may be determined using an AI model. However, when the distance to the subject is determined using an AI model, the determined distance may include error. For example, if a real object such as a person or a vehicle's license plate is generated as an image, the distance determined by the AI model may differ from the actual distance to the subject.

In the case of a specific subject, the difference between the reference position LB of the focus lens 112, which is calculated using the AI model, and the target position LT of the focus lens 112, which is calculated using the sharpness graph G, may exceed a predetermined threshold. In this case, the control unit 500 may designate the region within the imaging area 40 of the imaging unit 100 that includes the subject as an exclusion area 41 where the use of the AI model is excluded. The control unit 500 may then store the focal position of the focus lens 112 for the exclusion area 41 separately in the storage unit 400.

Once the exclusion area 41 is set, if the imaging unit 100 captures the exclusion area 41, the determination of the subject's distance and the focal position of the focus lens 112 by the AI model may be excluded. Then, the control unit 500 may move the focus lens 112 to the focal position stored in the storage unit 400 for the exclusion area 41. Through this, error in adjusting the focal position of the focus lens 112 can be prevented, and a faster adjustment of the focus lens 112 can be achieved.

The case where the exclusion area 41 is set when the difference between the reference position LB of the focus lens 112, calculated using the AI model, and the target position LT of the focus lens 112, calculated using the sharpness graph G, exceeds the predetermined threshold has been described so far. However, in some embodiments of the present disclosure, the exclusion area 41 may also be set when the difference between the reference position LB of the focus lens 112, calculated using a laser, ultrasound, or infrared, and the target position LT of the focus lens 112, calculated using the sharpness graph G, exceeds the predetermined threshold.

Figure 16:
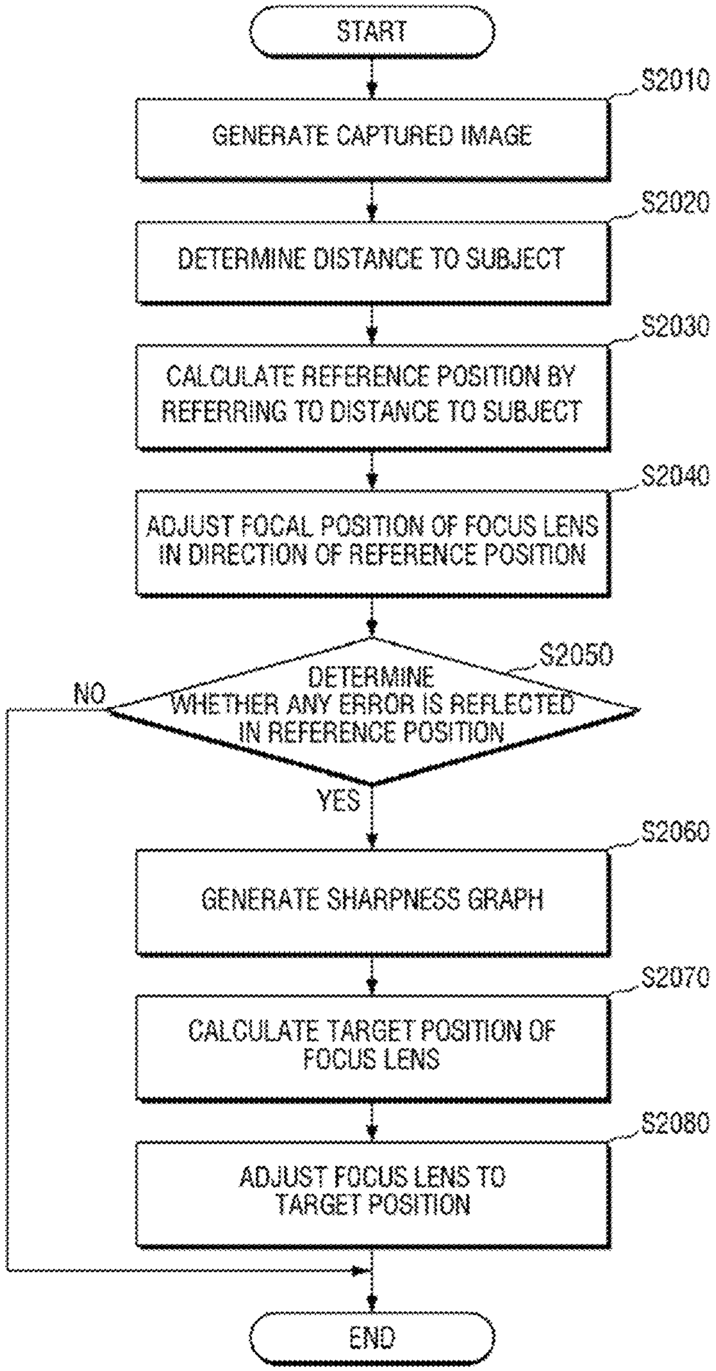
FIG. 16 is a flowchart illustrating an image capturing method according to an embodiment of the present disclosure.

FIG. 16 is a flowchart illustrating an image capturing method according to an embodiment of the present disclosure.

Referring to FIG. 16, the image capturing apparatus 10 may adjust the focal position of the focus lens 112 to enhance the sharpness of an image.

The imaging unit 100 of the image capturing apparatus 10 may generate a captured image by capturing a subject (operation S2010).

Thereafter, the distance determination unit 200 may determine the distance to the subject (operation S2020). Meanwhile, in some embodiments of the present disclosure, the distance to the subject may be determined by the distance determination unit 200 before the generation of the image by the imaging unit 100, or the generation of the image by the imaging unit 100 and the determination of the distance to the subject by the distance determination unit 200 may be performed simultaneously.

Thereafter, the reference position calculation unit 600 may calculate the reference position LB by referring to the distance to the subject (operation S2030). At this time, the reference position calculation unit 600 may apply not only the distance to the subject but also the magnification of the lens unit 110 and the installation environment of the imaging unit 100 to the focal position table 900 to calculate the reference position LB.

Once the reference position LB is calculated, the control unit 500 may adjust the focal position of the focus lens 112 in the direction of the reference position LB (operation S2040). At this time, the control unit 500 may adjust the focal position of the focus lens 112 in the pre-set increments toward the reference position LB. Specifically, the control unit 500 may adjust the focal position of the focus lens 112 during the time intervals between adjacent image frames among a plurality of image frames of the image. As the position of the focus lens 112 is adjusted, the sharpness calculation unit 300 may calculate the sharpness of the image at each focal position.

When the movement of the focus lens 112 to the reference position LB is complete, the control unit 500 may refer to the sharpness of the image calculated at the reference position LB to determine whether any error is reflected in the reference position LB (operation S2050). If it is determined that no error is reflected in the reference position LB, the control unit 500 may finely adjust the focal position of the focus lens 112 to perform contrast AF or terminate the adjustment of the focal position of the focus lens 112. Conversely, if it is determined that error is reflected in the reference position LB, the control unit 500 may calculate the target position LT.

As the focal position of the focus lens 112 is adjusted in increments, corresponding points are generated based on the combination of focal position and sharpness. To calculate the target position LT, the control unit 500 may transmit the corresponding points, representing the combination of focal position and sharpness, to the target position calculation unit 700.

The target position calculation unit 700 may calculate the target position LT of the focus lens 112 by referring to the pattern of sharpness changes corresponding to the adjustment of the focal position of the focus lens 112. Specifically, the target position calculation unit 700 may generate the sharpness graph G using the corresponding points transmitted by the control unit 500 (operation S2060). The sharpness graph G generated by the target position calculation unit 700 may be a 2D function graph with a maximum value.

The target position calculation unit 700 may calculate the focal position corresponding to the maximum sharpness on the sharpness graph G as the target position LT of the focus lens 112 (operation S2070). Once the target position LT is calculated, the control unit 500 may adjust the position of the focus lens 112 to the target position LT (operation S2080). When the movement of the focus lens 112 to the target position LT is complete, the control unit 500 may finely adjust the focal position of the focus lens 112 to perform contrast AF or terminate the adjustment of the focal position of the focus lens 112.

Once the target position LT is calculated, the control unit 500 may update the focal position table 900 using the target position LT. In other words, the control unit 500 may replace the reference position LB corresponding to the distance to the subject with the target position LT.

The components illustrated in FIGS. 1, 12, and 13 may be implemented by software or hardware such as field-programmable gate arrays (FPGAs) or application-specific integrated circuits (ASICs), but embodiments of the present disclosure are not limited thereto. These components may be configured to reside on a storage medium capable of addressing, or to be executed by one or more processors. The functions provided by these components may be implemented by more subdivided components, or multiple components may be combined to implement a specific function as a single component.

While non-limiting example embodiments of the present disclosure have been described with reference to the accompanying drawings, it will be understood by those skilled in the art that embodiments of the present disclosure can be implemented in other specific forms without departing from the spirit and scope of the present disclosure. Therefore, the described example embodiments should be considered in all respects as illustrative and not restrictive.

What is claimed is:

1. An image capturing apparatus comprising:
- an imager comprising a focus lens, the imager configured to generate an image of a subject;
- a distance determiner configured to determine a distance to the subject;
- a reference position calculator configured to calculate a reference position of the focus lens based on the distance to the subject; and
- a controller configured to adjust a focal position of the focus lens in a direction of the reference position,
- wherein the controller is further configured to determine whether any error is reflected in the reference position based on a calculated sharpness of the image corresponding to the focal position of the focus lens being at the reference position.

2. The image capturing apparatus of claim 1, wherein the controller is further configured to adjust the focal position of the focus lens in pre-set increments in the direction of the reference position.

3. The image capturing apparatus of claim 2, wherein the controller is further configured to adjust the focal position of the focus lens during time intervals between adjacent image frames among a plurality of image frames included in the image.

4. The image capturing apparatus of claim 3, further comprising:
- a sharpness calculator configured to calculate a sharpness of an image frame corresponding to the focal position of the focus lens whenever each of the plurality of image frames is generated.

5. The image capturing apparatus of claim 4, wherein the controller is further configured to move the focus lens during a time interval between when a sharpness of a previous image frame is calculated and when a sharpness of a subsequent image frame is calculated.

6. The image capturing apparatus of claim 4, wherein the controller is further configured to stop adjusting a position of the focus lens based on determining that a calculated sharpness of the image increases and then decreases.

7. The image capturing apparatus of claim 4, wherein the controller is further configured to determine that the error is reflected in the reference position based on the calculated sharpness of the image, corresponding to the focal position of the focus lens being at the reference position, being outside a threshold range.

8. The image capturing apparatus of claim 1, further comprising:
- a target position calculator configured to, based on determining that the error is reflected in the reference position, calculate a target position of the focus lens based on a pattern of sharpness changes corresponding to an adjustment of the focal position of the focus lens.

9. The image capturing apparatus of claim 8, wherein the target position calculator is further configured to form a sharpness graph using corresponding points between multiple selected focal positions of the focus lens and sharpness values calculated for the multiple selected focal positions, respectively, and calculate the target position of the focus lens based on the sharpness graph.

10. The image capturing apparatus of claim 9, wherein the target position calculator is further configured to set the focal position of the focus lens corresponding to a maximum value of the sharpness graph as the target position.

11. The image capturing apparatus of claim 9, wherein the controller is further configured to designate a region within an imaging area of the imager that comprises the subject as an exclusion area where use of an artificial intelligence (AI) model is excluded, based on determining that a difference between the reference position of the focus lens, calculated using the AI model, and the target position of the focus lens, calculated using the sharpness graph, exceeds a predetermined threshold.

12. An image capturing method by an image capturing apparatus including a focus lens, the image capturing method comprising:
- generating an image of a subject;
- determining a distance to the subject;
- calculating a reference position of the focus lens based on the distance to the subject;
- adjusting a focal position of the focus lens in a direction of the reference position; and determining whether any error is reflected in the reference position based on a calculated sharpness of the image corresponding to the focal position of the focus lens being at the reference position.

13. The image capturing method of claim 12, wherein the adjusting comprises adjusting the focal position of the focus lens in pre-set increments in the direction of the reference position.

14. The image capturing method of claim 13, wherein the adjusting comprises adjusting the focal position of the focus lens during time intervals between adjacent image frames among a plurality of image frames included in the image.

15. The image capturing method of claim 14, further comprising:

calculating a sharpness of an image frame corresponding to the focal position of the focus lens whenever each of the plurality of image frames is generated.

16. The image capturing method of claim 15, wherein the adjusting comprises moving the focus lens during a time interval between when a sharpness of a previous image frame is calculated and when a sharpness of a subsequent image frame is calculated.

17. The image capturing method of claim 12, wherein the determining whether any error is reflected in the reference position comprises determining that the error is reflected in the reference position, and wherein the method further comprises calculating, based on determining that the error is reflected in the reference position, a target position of the focus lens based on a pattern of sharpness changes corresponding to an adjustment of the focal position of the focus lens.

18. The image capturing method of claim 17, wherein the calculating the target position comprises:

forming a sharpness graph based on corresponding points between multiple selected focal positions of the focus lens and sharpness values calculated for the multiple selected focal positions, respectively; and calculating the target position of the focus lens based on the sharpness graph.

19. The image capturing method of claim 18, further comprising:

determining that a difference between the reference position of the focus lens, calculated using an artificial intelligence (AI) model, and the target position of the focus lens, calculated using the sharpness graph, exceeds a predetermined threshold; and setting, based on the determining that the difference exceeds the predetermined threshold, a region within an imaging area of the image capturing apparatus that includes the subject as an exclusion area where the use of an AI model is excluded.

20. A non-transitory computer readable medium comprising computer code configured to, when executed by at least one processor of an image capturing system, cause the image capturing system to:

generate an image of a subject;

determine a distance to the subject;

calculate a reference position of a focus lens of the image capturing system based on the distance to the subject;

adjust a focal position of the focus lens in a direction of the reference position; and determine whether any error is reflected in the reference position based on a calculated sharpness of the image corresponding to the focal position of the focus lens being at the reference position.

* * * * *